United States Patent [19]

Rysman de Lockerente et al.

[11] 4,404,105
[45] Sep. 13, 1983

[54] PROCESS FOR TREATMENT OF WASTE

[75] Inventors: Serge H. Rysman de Lockerente, Alsemberg; Norbert Van de Voorde, Mol, both of Belgium

[73] Assignee: Societe Internationale de Publicite et d'Agences Commerciales, Brussels, Belgium

[21] Appl. No.: 308,177

[22] Filed: Oct. 2, 1981

Related U.S. Application Data

[63] Continuation of Ser. No. 873,440, Jan. 30, 1978, abandoned, which is a continuation-in-part of Ser. No. 704,481, Jul. 12, 1976, abandoned.

[30] Foreign Application Priority Data

Jul. 16, 1975 [BE] Belgium .................................. 158349

[51] Int. Cl.$^3$ ........................... C02F 1/52; C02F 11/14
[52] U.S. Cl. ..................................... 210/710; 106/76; 106/117; 106/119; 210/712; 210/716; 210/724; 210/751; 210/912; 210/913; 210/914; 405/263
[58] Field of Search .................. 106/71, 74, 76, 89, 106/117–119; 210/609, 702, 710, 712, 714, 716, 717, 724, 726, 737, 738, 751, 911–914, 901; 405/128, 129, 263–266

[56] References Cited

U.S. PATENT DOCUMENTS

| 2,217,466 | 10/1940 | Baylis | 210/723 |
|---|---|---|---|
| 2,746,920 | 5/1956 | Wunderley | 210/667 |
| 3,094,846 | 6/1963 | Peeler | 47/702 |
| 3,388,060 | 6/1968 | Clark | 210/714 |
| 3,720,609 | 3/1973 | Smith et al. | 210/751 |
| 3,837,872 | 9/1974 | Conner | 106/74 |
| 3,841,102 | 10/1974 | Cinner et al. | 405/128 |
| 3,980,558 | 9/1976 | Thompson | 210/751 |
| 4,116,705 | 9/1978 | Chappell | 210/751 |

FOREIGN PATENT DOCUMENTS 52-9937  3/1977  Japan .
39650    2/1957  Poland .

Primary Examiner—Peter A. Hruskoci
Attorney, Agent, or Firm—Holman & Stern

[57] ABSTRACT

Process for the irreversible treatment of toxic waste by means of a silicate, in the presence of water, in such a way as to form a solid aggregate includes treatment of the silicate in an acid medium, for the purpose of obtaining silicic acid of low molecular weight; mixing the silicic acid with the waste to be treated, in the presence of water and controlling the pH between 0 and 4 in a sufficiently acid medium to cause the waste to undergo at least partial solution; precipitation of a gel of high molecular weight from the resultant aqueous mixture; addition thereto of a mixture which reacts with the gel of high molecular weight to form a silicate, possibly in the presence of a cementation agent, in such a way as to produce a sludge, and the hardening of the sludge into a solid aggregate which can not be changed physically so as to release again the harmful or toxic waste into the environment.

36 Claims, No Drawings

PROCESS FOR TREATMENT OF WASTE

CROSS REFERENCE TO RELATED APPLICATIONS

This application is a continuation of application Ser. No. 05/873,440 filed Jan. 30, 1978 (now abandoned), which is a continuation-in-part of application Ser. No. 05/704,481 filed July 12, 1976 (now abandoned).

FIELD AND BACKGROUND OF THE INVENTION

The present invention relates to a process for the treatment of waste, particularly of toxic waste, by chemically combining the waste with a silicate, in the presence of water with controlled pH, in order to form a solid aggregate which can not be physically changed to regenerate or release the waste again into the environment.

PRIOR ART

Various processes are known in which waste is mixed with a silicate and with a cementation agent, in the presence of water, in such a way as to form a suspension, after which the latter is allowed to harden into an aggregate of stony concretion in which the pollutant waste is encapsulated. The resulting aggregates can be used, for example, as filling materials. The silicate used in these known processes consists of an alkaline metal silicate, an aluminum silicate or an alumino-silicate, while Portland cement is used as the cementation agent. Processes of this type are described in French Pat. No. 1,246,848 and in German Pat. No. 2,228,938. French Pat. No. 2,242,752 likewise describes a process which does not include the use of a cement but in which the product undergoes a thermal treatment.

Although the aggregates obtained by these processes satisfy certain standards laid down for the protection of the environment, they nevertheless suffer from the major drawback that in the event of their rupture or fragmentation which may be caused by a pressure exceeding their mechanical strength, e.g. while they are being transported or tipped onto the site, they will release the toxic substances which are encapsulated in the casing of stony concretion. These toxic substances, thus released, may once again present a danger, particularly if carried along by streams, thus polluting the waterways. A further drawback of the down processes resides in the fact that after a more or less lengthy period of stony concretions in which the toxic waste is encapsulated may undergo delapidation or disintegration, thus releasing the toxic substances.

The present invention differs from the prior art in that the inventors aim at a chemical reaction between metallic ions and substantially monosilicic or disilicic acid which will thereafter polymerize and be disposable.

Any prior art is distinguishable wherein either (a) the metal is not in aqueous solution when put into contact with silicic acid, (b) no monomeric silicic acid is formed (e.g. when a gel is formed or silica is formed), or (c) the pH is such that the metal ions will precipitate as hydroxides rather than react with monomeric or slightly polymerized silicic acid.

The following may distinguish the claimed inventon over the prior art particularly U.S. Pat. No. 3,837,872 and U.S. Pat. No. 2,217,466, and show the criticality of the specific pH.

The process of the invention aims at the formation of metal silicates by a reaction of silicic acid of low molecular weight, such as mono or di-silicic acid, with the heavy metals contained in the waste. This reaction is slow and as this reaction enters in competition with another one, namely the precipitation of the hydroxides of the heavy metals, and also with the polymerization of the silicic acid with formation of a gel, it is necessary to maintain adequate physical and chemical conditions. It is known on the one hand that hydroxides of heavy metals (which are of course precipitates) are formed at pH values which vary with the nature of said metal ($Fe^{+++}$: pH 2, 5; Cr and Al: pH 3, 5; Cu: pH; Zn: pH 5; Cd: pH 6; Fe: pH 7; Ni: pH 8) and on the other hand that the silicates of said metals are formed at a pH lower than the pH necessary for the formation of the hydroxide. Furthermore, it is known (see Iler, R. K. "The Colloid Chemistry of Silica and Silcates", Cornell U. Press, Ithica, N.Y.-1955, p. 45: diagram) that a pH range between 1 and 4 is unfavorable for the formation of a silicic acid gel. Therefore, one of the characteristics of the process of the invention is to make a compromise between the kinetics of said reactions and to maintain, in the beginning, a pH value lower than about 4 in order to prevent the precipitation of the hydroxides and also to obtain a non- or only slightly polymerized silicic acid; later on, the pH is raised and this leads to the formation of metal silicates precipitates which are ultimately linked in the silicic skeleton of the gel.

In a preferred embodiment of the process of the invention, the silicic acid required for the reaction with the heavy metals is slowly produced by reaction of a granulated slag (calcium aluminosilicate) with a strong acid at a pH-value between e.g. 0.5 and 3. The silicic acid may also be produced from an alkali metal silicate or an alkaline earth metal silicate and an acid. In this case, the addition of the alkaline or alkaline earth compound must be progressive in order to provide a slow formation of silicic acid and to avoid the polymerization of the latter. The tests carried out by the inventors show that the treatment of heavy metal salt with a silicic acid produced in this way and the subsequent raising of the pH by an addition of milk of lime leads to products wherein the heavy metals are chemically and intimately bound to the silicic skeleton of a highly polymerized gel.

The process according to U.S. Pat. No. 3,837,872-CONNER is completely different from the present invention. In this process a waste is mixed with an aqueous solution of an alkali metal silicate such as sodium silicate and with a silicate setting agent (cement, lime, gypsum, calcium carbonate) in order to give rise to a reaction between the alkali metal silicate and the setting agent leading to a material which entraps (encapsulates) the waste components. The use of an alkali metal silicate without addition of an acid gives rise to a high pH (about 14) and to the precipitation of the hydroxides of the metals present in the waste (see column 5, lines 3-4); the reaction products of this process consist in a matrix of silica gel and of cement which encapsulates the waste containing possibly metal hydroxides. There is a production neither of silicic acid nor of silicates of heavy metals. This process is rather rapid, necessitating a gel time of a few minutes (see column 6, line 24), whereas the process of the invention must be slow in order to secure the formation of silicates of heavy metals which are finally bound to the silica gel. Furthermore, it has been shown below that wastes wherein the pollutants have only been encapsulated are not adequate for protection of the environment.

The process according to U.S. Pat. No. 2,217,466-BAYLIS does not concern the same subject matter as the present invention. It relates to a process of water treatment involving the removal of substances by commonly known coagulants (inorganic salts of aluminum and iron) used in connection with a coagulation enhancing quantity of an agent including a partially neutralized alkali metal silicate. Contrary to the process according to the present invention, the Baylis process uses a somewhat polymerized silica (column 2, line 34) and a pH value comprised between 7.5 and 10 (column 4, line 52).

Consequently, it is impossible to obtain a process resembling the present process of the invention by combining U.S. Pat. No. 3,837,872 with U.S. Pat. No. 2,217,466.

BRIEF SUMMARY OF THE INVENTION

The present invention remedies the aforementioned drawbacks of the existing solid aggregates.

The present invention also provides method for the treatment of waste, particularly toxic waste, comprising the use of a silicate, in the presence of water with controlled pH, thus enabling solid aggregates to be obtained which satisfy certain standards laid down for the protection of the environment, whatever their state, i.e. which will not release the toxic substances contained in them, even after rupture or fragmentation.

The present invention further provides a process comprising the steps of: treatment of a silicate in an acid medium in order to obtain silicic acid of low molecular weight, mixing the said silicic acid with waste to be treated, in the presence of water and in a sufficiently acid medium to ensure that the waste will undergo at least partial solution, precipitation of a gel of high molecular weight from the resultant aqueous mixture and finally hardening of the gel into a solid aggregate.

DESCRIPTION OF PREFERRED EMBODIMENTS

One embodiment of the process according to the invention provides for the addition of a material which reacts with the gel of high molecular weight to form a silicate.

In a further particular embodiment of the process according to the invention, a cementation agent is added to a gel of high molecular weight in such a way as to produce a sludge, which is then allowed to harden into a non-toxic solid aggregate.

In a particularly advantageous embodiment of the invention, use is made of lime, sodium hydroxide or some other base as the material reacting with the gel to form a silicate.

The invention also covers the non-toxic solid aggregates obtained by the process described above.

Further embodiments and characteristics of the invention will emerge from the description given hereunder, by way of a non-limitative example, of certain special embodiments of the invention.

DESCRIPTION OF SPECIFIC EMBODIMENTS OF THE INVENTION

According to the invention, the waste to be treated may contain one or more heavy metals including: aluminum, antimony, silver, arsenic, barium, beryllium, bismuth, cadmium, calcium, cerium, cesium, chromium, cobalt, copper, tin, iron, lithium, magnesium, manganese, mercury, nickel, lead, plutonium, radium, strontium, thorium, uranium, vanadium and zinc. These various metals can be combined with other elements or groups of elements to form compounds, for example, such as oxides, hydroxides or salts. The waste may thus contain anions, such as the anions of sulphate, sulphite, nitrate, nitrite, phosphate, phosphite, fluoride, chloride, bromide, nitride, cyanide, sulphide, cyanate, thiocyanate, thiosulphate, ferricyanide or ferrocyanide. In addition to the various elements or groups of elements mentioned the waste may also include, in particular, organic compounds containing a polar function such as, for example, acids, bases, proteins, carbohydrates, fats, therapeutic agents, coloring agents, pesticides, detergents and also mineral oils and hydrocarbons.

The waste which is usefully treated by the process of the present invention is of varying origin; certain types of waste suitable for this purpose are given hereunder in Table I and classified according to the categories to which they belong and the types of industry from which they originate.

TABLE I

| INDUSTRY | CATEGORY OF WASTE | PHYSICAL STATE |
| --- | --- | --- |
| Steel industry | Pickling | Liquids |
|  | Neutralization | Sludges |
|  | Material collector | Solids & Sludges |
|  | Regeneration of acids | Soluble Salts |
| Mining | Neutralization station | Liquids |
| Power stations | Boilers | Ash |
| Surface treatment works | Metal salts | Liquids |
|  | Acids and bases | Liquids |
|  | Purification of waste water | Liquids & Sludges |
|  | Recuperation of ion exchangers | Liquids |
| Chemical factories | Acids and bases | Liquids |
|  | Metal salts | Liquids |
| Non-ferrous metals | Pickling | Liquids |
|  | Recuperation of acids | Soluble salts |
|  | Manufacturing waste | Solids |

Certain micro-pollutant constituents originate from other industires, such as mercury emanating from pesticides, paper pulp and the constituents of electric cells, vanadium emanating from hydrocarbons in which it is contained, lead originating from fuels and lubricants, zinc which comes from the kerosenes used in aviation, the radioisotopes of uranium, cobalt, cesium, plutonium, radium, thorium, etc. emanating from waste emitted by the treatment of ore, nuclear reactors, installations for the treatment of irradiated fuel, etc.

As already indicated in the foregoing, a first phase of the invention comprises the preparation of silicic acid from a silicate in an acid medium. The silicate used for this purpose is a silicate of an alkaline metal, of an alkaline earth metal or of aluminum, or else an alumino-silicate, this latter likewise consisting, preferably, of residues or by-products, e.g. slags especially blast furnace slags or flue dust emanating from the combustion of fuels such as coke. Generally speaking, the silicate is added to the acid in aqueous solution, in order to give the mixture a pH value between 0.5 and 3, preferably between 1 and 3, the acid consisting, in particular, of sulphuric acid, hydrochloric acid or nitric acid, or possibly a mixture of these acids. After a sufficient period the solids are separated from the liquid, possibly by means already known, such as filtration and/or decantation. The resulting solution consists of a mixture of monosilicic acid and silica sol, of which the polymerization is very limited and which, for reasons of convenience will be hereinafter termed "low-polymerization silicic acid" or "silicic acid of low molecular weight". This low-polymerization silicic acid consists of mono-, bi-, tri-, tetrasilicic and polysilicic acid, the molecular weight, however, not exceeding 50,000. For this reason it is important to obtain a pH value between 0.5 and 3 when adding the acid, since the pH values outside this range tend to cause excessive polymerization of the silicic acid. The silicic acid of low molecular weight must as far as possible be immediately mixed with the waste to be treated, in view of its instability and the fact that its polymerization grade increases in proportion to the time allowed to elapse. The silicic acid cannot be stored for more than a few days, at the most, before being used.

According to the invention, the waste to be treated is mixed with the low-molecular weight silicic acid, in the presence of water in a sufficiently acid medium to cause the waste to undergo at least partial solution. Preferably, the waste is partly dissolved in advance, in a separate phase, before being added to the silicic acid. The waste to be rendered soluble can also be mixed with the slag, these residues being rendered soluble when the acid is added. The expression "caused to undergo at least partial solution" or "rendered partially soluble" means that approximately 70% of the waste goes into solution, the remainder consisting, generally speaking, of products which cannot be rendered soluble, such as certain organic substances. The waste preferably undergoes this treatment until between about 85 and about 95% by weight of the substance of which it consists has been rendered soluble. The acids used may likewise consist of a waste, residue or by-product, such as a pickling solution.

If the waste being treated is of the type which imparts to the water a sufficiently acid pH value to cause the waste to go into partial solution, there is obviously no need to add supplementary acid. If the waste is of low acidity or of a neutral or alkaline type a sufficient quantity of acid will be added to reduce the pH value to about 1 or less. Needless to say, the quantity of acid to be added will depend first and foremost on the pollutant elements contained in the waste. In the case of waste containing iron and copper, for example, the pH value will have to be brought down to 4, in order to render the copper soluble, in the form of hydroxide, while in the case of iron the pH value must be brought down to 1. The temperature conditions and the duration of the solubilization process are not decisive factors, but it is obviously preferable for the latter to be continued until the waste has totally dissolved, particularly the pollutant elements contained therein.

According to the invention, the waste, once it has been partly or entirely dissolved, reacts with the silicic acid of low molecular weight to form a gel of high molecular weight, this reaction being preferably effected with the use of a catalyst of which the purpose is to activate the precipitation of the gel. As a means of catalyzing the precipitation of the gel for this purpose, it is desirable to use a base. For example, if the mixture of solubilized waste and silicic acid has a pH value of about 2 and the waste contains toxic substances which cannot be precipitated at a pH value of less than 4, a base should be added, in a sufficient quantity to insure a pH of 4. The catalytic reagents used usually consist of a sludge, such as sodium hydroxide, potassium hydroxide, calcium hydroxide, carbonates or hydrocarbonates, or a mixture of these bases, these catalysts being preferably used in an impure form (e.g. Belgian or English slags, etc., as basic catalysts).

It should nevertheless be noted that the use of a basic catalyst is to be preferred, particularly when the waste contains metals, since the pollutant elements can generally be incorporated more satisfactorily into the polymer chain of the gel when the pH value is above 2. At pH values above 2, (this value corresponding to the zone in which the ionization and thus the polymerization of the silicic acid is at a minimum), the silicic acid ionizes intensively and reacts easily with the pollutant elements, particularly if the latter consist of metals. At pH values of less than 2 the ionization of the silicic acid is less intensive and the pollutant elements are generally not incorporated so easily into the polymer chain. This is why it is particularly desirable for the added catalyst to consist of a base, preferably in a quantity such that it will increase the pH value of the medium up to 8.

The gel thus formed according to the invention is in actual fact a co-precipitate of highly polymerized silicic acid (silica gel) and of hydrated pollutant elements emanating from waste (when the pollutant elements consist of metals they are present in the gel in the form of metallic silicates) which are incorporated into the polymer chain of the silica gel, thus forming a chain of high molecular weight in which it is believed the pollutant elements are directly linked to the silicium atoms, probably alternating with the latter, i.e. each silicon atom is connected to at least one pollutant element.

The temperature conditions and the duration of the treatment are not decisive factors, but the polymerization sometimes takes place more rapidly when the mixture of silicic acid and solubilized waste is shaken while the catalyst is being added. The resulting highly-polymerized gel can then be left to harden, in order to obtain a solid aggregate. The gel can also be heated in order to activate the hardening process.

As mentioned before, the highly-polymerized gel is preferably given an addition of a substance which reacts with the gel to form a silicate, such as lime, in a slaked or hydrated form, or caustic soda or else a cementation agent, e.g. in powder form. A mixture of lime and cementation agent is found particularly effective.

It will be noted that for this purpose it is equally possible to separate the gel from the remainder of the aqueous solution containing it, this operation being carried out by known means for the separation of solids and liquids, such as filtration and/or decantation, and to recycle this solution, which in actual fact consists of practically pure water, into one of the phases of the process. In this case the matter reacting with the gel to form a silicate and/or the cementation agent will be added in the presence of water, e.g. in the form of a liquid paste. The suitable cementation agents are Portland cements with or without secondary constituents, mixed metallurgical cements, clinker slag cements, super-sulphated cements, aluminous cements, sodium silicate or mixtures of these various cementation agents.

The quantity of water required for the reaction must be at least about 15% by weight in relation to the rest of the solid substances. Needless to say, the greater the quantity of water, the longer the gel or the sludge will take to harden, regardless of whether or not the reaction is carried out with the use of a substance which reacts with the gel to form a silicate and/or the cementation agent.

The quantity of cementation agent must be such that, when mixed with the gel and possibly with other agents, a sludge can be obtained. For this purpose, therefore, if the aqueous solution is separated from the highly polymerized gel a sufficient quantity of water must be added to the cementation agent or to the lime, in order to insure that the mixture will have the consistency of a sludge, and thus to hydrate the constituents together. Nevertheless, the quantity of cementation agent, which in actual fact largely depends on the quantity of water in the presence of which the process is carried out and also on the nature and quantity of the highly polymerized gel, will generally speaking amount to between about 5 to 50% in relation to the weight of the mixture. For each mixture, therefore, any increase in the quantity of gel in relation to the cementation agent will result in a reduction in the compressive strength of the solid aggregate thus obtained.

If the waste contains a fraction consisting of organic constituents, these can be added before or after the formation of the gel, since these constituents are directly absorbed and chemi-adsorbed onto the gel. These organic constituents will preferably be added in the form of a solution or a suspension in water, at concentrations of from about 5 to about 20% by weight, for example. Among the organic substances which can undergo this treatment without difficulty are acid waste, such as carboxylic acids and phenols, latex waste, bases, such as aminated bases, etc., salts such as stearates, oleates, etc.

As may be seen from the foregoing, once the gel or the sludge has formed the time which it will take to set or harden will depent on a large number of factors, such as the proportion of water, of cementation agent, of lime or of caustic soda and of highly polymerized gel, the nature of the pollutant elements incorporated in the gel, the temperature, etc. Generally speaking, an increase in the temperature involves a reduction in the setting time required.

The major advantage of the solid aggregates obtained by the process to which the present invention relates is that in the event of their rupture or fragmentation they no longer present any danger and have lost their entire toxic power. The fact is that the pollutant elements are not encapsulated, as in the stony concretions obtained by the processes hitherto known, which in the event of the rupture of the stony casing results in the release of the toxic constituents, generally in the form of hydroxides. On the contrary, they are well dispersed throughout the mass of the aggregate. Since the aggregates obtained by means of the present invention have lost their toxicity, even after rupture, it may be assumed that each pollutant atom is bound to a silicium atom in the form of a highly reticulated crystalline silicate; the pollutant or toxic elements are thus completely insolubilized and can no longer go into solution, even when in direct contact with streams, since they are intimately bound to the silicium atoms.

A further appreciable advantage of the process to which the invention relates, by comparison with the processes covered by the prior art, resides in the fact that when a cementation agent is adopted it is added in far smaller quantities, which constitutes a genuine saving, in view of the comparatively high costs of cements. The fact is that in the known process the proportion of cementation agent added amounts to at least 100% of the total weight of the dry substances present, a percentage which, moreover, may actually be multiplied by between 10 and 70, according to the circumstances.

The agglomerates obtained by the use of the present invention can be used as filling materials or for other purposes, such as the manufacture of building components, or even for the purpose of burying certain wastes, such as household wastes, which are not treated by the process of the invention.

The aggregates provided by the invention are extremely strong products of which the degree of lixiviation (leaching) in water is very low, generally less than 0.0008%. In this connection it will be noted that the degree of lixiviation of the agglomerates is generally speaking still lower if the organic products are incorporated therein, in the dosages indicated in the foregoing, and this indicates the extremely wide field of application available for the process to which the invention relates.

The invention will be described in greater detail by reference to the following examples, provided solely by way of illustration.

EXAMPLE 1

In a vessel fitted with an agitator are placed 100 g of granulated slag, 250 ml of water, 80 g of sludge (30% dry substance) containing Fe (23%) Cu (9%) Ni (0.25%) Cr (3.7%) Cd (1.4%) Be (0.2%), and 3.8 g of $K_2CR_2O_7$ as well as 35 ml of HCl at 32%, to cause the sludges to go into solution. Keeping the pH value between 0.5 and 2.5, 36.6 ml of HCl at 32% is then likewise introduced, followed by 144 ml of $H_2SO_4$ (40%).

The polymerization is then carried out, accompanied by a progressive increase of the pH up to 7, with any suitable base.

The cementation of the granulates is carried out with the addition, still in the same vessel, of a mixture consisting of 100 g of granulated slag, 30 g of cement and 25 g of lime (waste) or 14 g of NaOH (waste). The product thus formed consists of a sludge which, after three days, turns into a solid material.

EXAMPLE 2

Into a receptacle fitted with an agitator are introduced 100 g of granulated slag, 250 ml of water, 3.8 g of $K_2CR_2O_7$ and then 36.6 ml of HCl (32%) and 144 ml of $H_2SO_4$ (40%), the pH value being kept between 0.5 and 2.5.

The calcium sulphate formed is separated and the filtrate is given in addition of 100 g of sludges solubilized in 35 ml of HCl at 32% and containing 25% of dry substance and and Fe (5.26%) Cr (2.94%) Ni (3.65%) Cu (0.76% Cd (3.06%) Zn (26.9%) Al (0.91%) Cl (3.37%) $SO_4$ (7.32%) CN (0.0044%) $NO_2$ (0.00075%).

The mixture is shaken and the polymerization carried out with a progressive increase of the pH value up to 7. 50 g of sodium phenate solution (10% of dry substance) is then introduced. A mixture of 100 g of slag, 30 g of Portland cement and 25 g of lime (waste) is introduced in order to effect the cementation. The product consists of a sludge which hardens after three days.

EXAMPLE 3

Into a vessel fitted with an agitator are introduced 100 g of granulated slag, 2 g of copper perchlorate, 10 g of sodium phosphate, 3 g of sodium fluoride and 20 ml of water, after which the pH value being kept between 0.5 and 2.5, 27 ml of HCl (32%) and 600 ml of a solution of waste is introduced, the latter containing $H_2SO_4$ (106 g/liter), Cu (400 mg/l), Zn (19.2 g), Cr (2.5 mg/l).

While the polymerization is being carried out the pH value will be progressively increased up to 8, and the product is washed with 200 ml of water.

The cementation of the residual precipitate is effected by adding 100 g of granulated slag, 30 g of cement and 12 g of caustic soda.

The sludge thus obtained hardens after three days.

EXAMPLE 4

Into a vessel fitted with an agitator are introduced 100 g of granulated slag, 3 g of sodium periodate, 200 ml of water and 10 g of copper stearate (waste) and 60 g of a sludge at 40% of dry substance, containing Ni (33.5%) Zn (16.2%) Cu (13.64%) CN (0.02%). A 140 ml of $HNO_3$ at 30% is added, the pH being kept between 0.5 and 2.5, after which 144 ml of $H_2SO_4$ at 40% is introduced. After the addition of the acid the polymerization is carried out with a progressive increase of the pH up to 7.

The cementation is carried out by adding 100 g of slag, 30 g of cement and 20 g of lime.

EXAMPLE 5

Into a vessel fitted with an agitator are introduced 100 g of slag, 3.8 g of $K_2Cr_2O_7$, 250 ml of water, 70 g of a sludge containing 7% organic substance, 4% sodium chloride, 8 ammonium sulphate, 25% aluminum hydroxide and 3% calcium phosphate, after which 35 ml of HCl (32%), 144 ml of $H_2SO_4$ (40%) and 10 g of acetic acid are likewise added, the pH being kept between 0.5 and 2.5.

After these additives have been introduced, 15 g of sludge emanating from the manufacture of latex paint is added, the pH value being progressively increased up to 7.

The cementation is carried out by adding 100 g of slag, 30 g of Portland cement and 20 g of lime.

The hydrogen sulphide emanating from the sulphides present in the slag serves to reduce the oxidizing constituents, such as $Cr^{6+}$, the periodate and the perchlorate introduced in the various examples.

What is claimed is:

1. A process for the formation of a chemically stable solid aggregate of wastes containing at least one heavy metal or heavy metal compound which is at least partially water soluble under acid conditions comprising the sequential steps of:
   (a) forming a low-polymerization-silicic-acid of molecular weight not exceeding 50,000 by reacting
      (i) a silicate selected from at least one of the group consisting of alkaline earth metal silicates, aluminum silicates, and aluminosilicates,
      (ii) water, and
      (iii) acid sufficient to provide the reaction mixture with a pH between about 0.5 and about 3;
   (b) mixing
      (i) the wastes containing heavy metals or heavy metal compounds, and
      (ii) the low-polymerization-silicic-acid, with
      (iii) sufficient water and acid, to adjust the mixture to one having at least 70% dissolved solids and a pH of less than 4;
   (c) synthesizing a higher-polymerization-silicic-acid/hydrated-heavy-metal coprecipitate gel, by reacting
      (i) the low-polymerization-silicic-acid, and
      (ii) the cations of the heavy metal in the wastes,
      (iii) in the presence of a base catalyst selected from at least one of the group consisting of sodium hydroxide, potassium hydroxide, calcium hydroxide, their carbonates or hydrocarbonates, in an amount sufficient to increase the pH of the mixture to progressively to at least 7; and
   (d) hardening the coprecipitate gel into a chemically stable solid aggregate;
   wherein the total amount of water in above steps (a) through (d) is at least 15 percent by weight based upon the total weight of solids.

2. The process of claim 1 wherein the pH of step (a) is between about 1 and about 3.

3. The process of claim 2 wherein the heavy metal or heavy metal compound contained in the wastes to be aggregated is at least one of the group consisting of aluminum, antimony, silver, arsenic, barium, beryllium, bismuth, cadmium, calcium, cerium, cesium, chromium, cobalt, copper, tin, iron, lithium, magnesium, manganese, mercury, nickel, lead, plutonium, radium, strontium, thorium, uranium, vanadium, and zinc, and a compound of any of these metals, including an oxide, hydroxide or salt, consisting of at least one anion of the anions of sulphate, sulphite, nitrate, nitrite, phosphate, phosphite, fluoride, chloride, bromide, nitride, cyanide, sulphide, cyanate, thiocyanate, thiosulphate, ferricyanide or ferrocyanide.

4. The process of claim 3 wherein the wastes also contain at least one organic compound having a polar function.

5. The process of claim 4 wherein the organic compound is a carboxylic acid, protein, carbohydrate, fat, therapeutic agent, coloring agent, pesticide, detergent, mineral oil, hydrocarbon, phenol, latex waste, aminated base, stearate, oleate, or mixture of any of the above.

6. The process of claim 4 wherein the organic wastes are present in a concentration of from about 5% to about 20% by weight of the weight of the wastes and are in the form of an aqueous solution or suspension.

7. The process of claim 6 wherein the organic wastes are added before step (c).

8. The process of claim 6 wherein the organic wastes are added after step (c).

9. The process of claim 2 wherein the wastes contain solids which are dissolved before mixing with the low-polymerization-silicic-acid in step (b).

10. The process of claim 2 wherein the wastes are selected from at least one of the group consisting of:
    (i) steel industry-pickling liquids, neutralization sludges, solids and sludges produced by a material collector, soluble salts produced by the regeneration of acids,
    (ii) mining-liquids produced by a neutralization station,
    (iii) power station produced boiler ash,
    (iv) surface treatment works-metal salt liquids, acid and base liquids, purification of waste water liquids and sludges, liquids produced by recuperation of an ion exchanger,
    (v) chemical factory-acid and base liquids, metal salt liquids,
    (vi) non-ferrous metal-pickling liquids, soluble salts produced by recuperation of acids, and solids which are manufacturing waste.

11. The process of claim 10 wherein the wastes are acidic liquids having at least 70% dissolved solids and a pH of 4 or less.

12. The process of claim 11 wherein no further water or acid is added in step (a).

13. The process of claim 2 wherein the silicate of step (a) is a solid aluminosilicate which is a blast furnace slag.

14. The process of claim 13 wherein the slag is granulated and step (d) is conducted by adding lime or sodium hydroxide to the coprecipitate gel to harden the same.

15. The process of claim 2 wherein the acid of step (a) is sulphuric, hydrochloric, nitric, or a mixture of at least two thereof.

16. The process of claim 2 wherein the mixture of step (b) has at least about 85% to 95% dissolved solids.

17. The process of claim 16 wherein substantially all of the wastes solids are dissolved.

18. The process of claim 2 wherein the mixing of step (b) is conducted within a time ranging from immediately the low-polymerization-silicic-acid is formed up to about three days.

19. The process of claim 18 wherein the mixing of step (b) is conducted substantially immediately the low-polymerization-silicic-acid is formed.

20. The process of claim 2 wherein the wastes solids are dissolved in advance, in a separate phase, prior to mixing with the low-polymerization-silicic-acid.

21. The process of claim 2 wherein the pH of the wastes is from low acidity to alkaline and a sufficient quantity of acid is added in step (b) to reduce the pH to about 1 or less.

22. The process of claim 3 wherein the wastes contain at least copper and the pH of step (b) is about 4 or less, in order to render the copper soluble.

23. The process of claim 3 wherein the wastes contain at least iron and the pH of step (b) is about 1 or less, in order to render the iron soluble.

24. The process of claim 2 wherein the pH of step (c) is increased up to from about 7 to 8.

25. The process of claim 2 wherein the base catalyst is a basic slag.

26. The process of claim 2 wherein the base catalyst is lime or sodium hydroxide.

27. The process of claim 2 wherein step (d) is conducted by permitting the coprecipitate gel to harden in the absence of a cementation additive.

28. The process of claim 27 wherein the coprecipitate gel is heated to accelerate hardening.

29. The process of claim 2 wherein step (d) is conducted by adding a cementation agent to the coprecipitate gel accompanied by mixing, in an amount sufficient to form a sludge, and permitting the sludge to harden.

30. The process of claim 29 wherein the cementation agent is selected from at least one of the group consisting of Portland cements with or without secondary constituents, mixed metallurgical cements, clinker slag cements, supersulphated cements, aluminous cements or sodium silicate.

31. The process of claim 30 wherein the amount of cementation agent added is from about 5% to about 50% by weight of the total mixture.

32. The process of claim 29 wherein step (d) is conducted by adding a hardening aid to the coprecipitate gel selected from at least one of the group consisting of slaked lime, hydrated lime, and caustic soda.

33. The process of claim 32 wherein the gel or step (c) is first separated from the aqueous solution containing it and the resulting practically pure water is recycled.

34. The process of claim 33 wherein the water is recycled into step (b) of the process.

35. The process of claim 33 wherein the water is recycled into step (d) of the process by using it to form a liquid paste with at least one of the group consisting of the cementation agent or the hardening aid.

36. The process of claim 2 wherein step (d) is conducted by adding a hardening aid to the coprecipitate gel selected from at least one of the group consisting of slaked lime, hydrated lime, and caustic soda.

* * * * *